(No Model.)
T. W. DOWNS.
STREET SWEEPER.
No. 518,716. Patented Apr. 24, 1894.
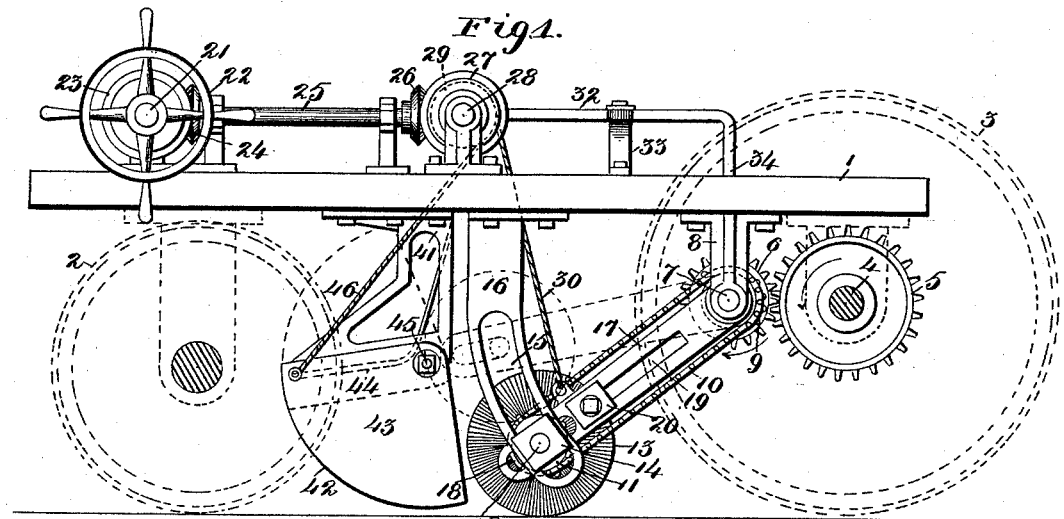
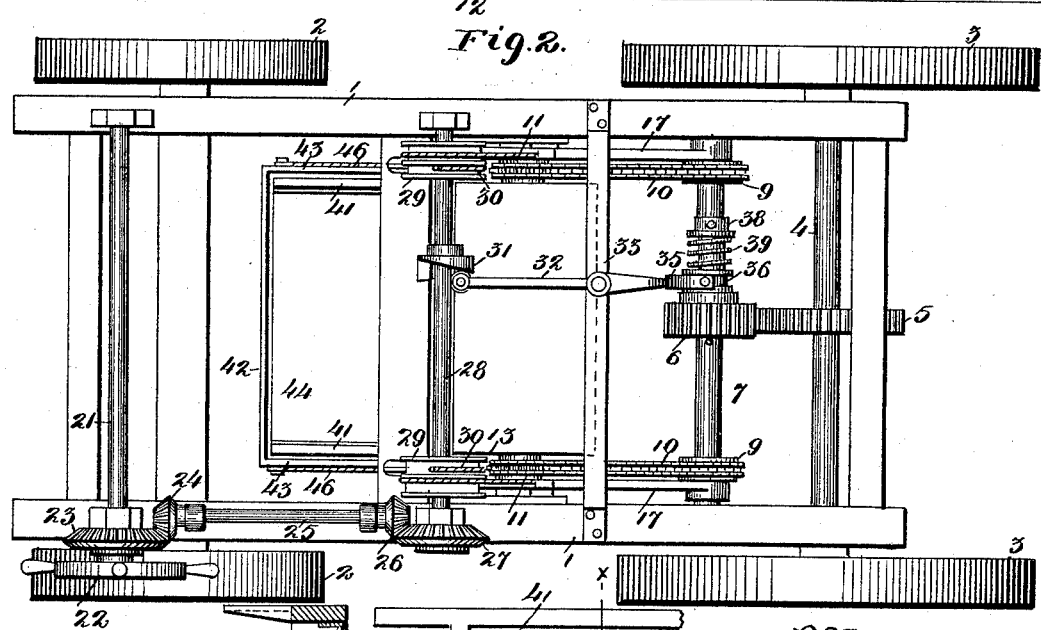
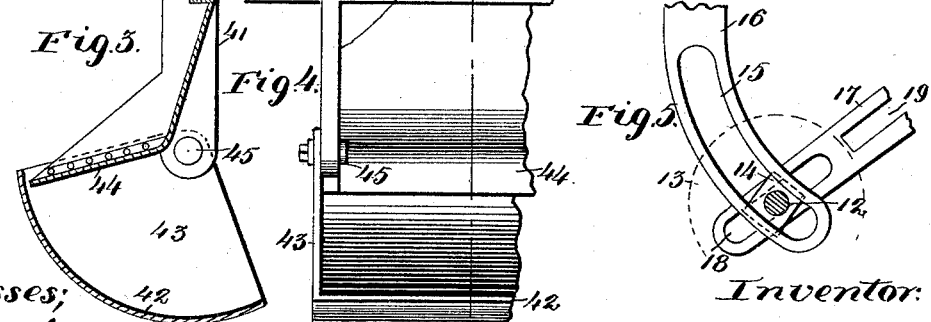
Witnesses:
Inventor:
T. W. Downs.
By Keller & Strek
Attorneys.

UNITED STATES PATENT OFFICE.

TAYLOR W. DOWNS, OF ST. LOUIS, MISSOURI.

STREET-SWEEPER.

SPECIFICATION forming part of Letters Patent No. 518,716, dated April 24, 1894.

Application filed January 29, 1894. Serial No. 498,315. (No model.)

*To all whom it may concern:*

Be it known that I, TAYLOR W. DOWNS, of the city of St. Louis, State of Missouri, have invented certain new and useful Improvements in Street-Sweepers and Pilers, of which the following is a full, clear, and exact description, reference being had to the accompanying drawings, forming a part hereof.

My invention has relation to improvements in street sweepers and pilers and consists in the novel arrangement and combination of parts more fully set forth in the specification and pointed out in the claims.

In the drawings, Figure 1 is a side elevation of my complete invention with the wheels removed. Fig. 2 is a plan view of the machine. Fig. 3 is a section on the line x—x of Fig. 4. Fig. 4 is a plan view of part of the interior of the dumping receptacle. Fig. 5 is a detail of the slotted arm carrying the brush-shaft and the slotted guide plate within which the shaft bearings operate; and Fig. 6 is a sectional detail of the clutch operating the brush gearing.

The present device is an improvement on the sweeper and piler described in my pending application for Letters Patent, Serial No. 491,380, filed November 20, 1893, and has for its object (first) to positively force the contents from the dumping receptacle in the act of dumping, (second) to simultaneously dump the contents and elevate the brush from the street, and (third) to disconnect the gearing of the brush from the driving mechanism in the act of elevating said brush from the ground.

In detail the apparatus may be described as follows:

Referring to the drawings, 1 represents an ordinary frame mounted on the front wheels 2 and the driving wheels 3. The shaft 4 of the driving wheels has secured thereto at a convenient point, but preferably in the middle of its length, a main driving gear wheel 5 meshing with a second gear 6 retained in any mechanical manner but loosely mounted on a shaft 7 rotating within suitable bearings of the depending supports 8 secured one on each side of the frame 1. On either side of the gear 6 and fixed to the shaft 7 is a sprocket wheel 9 over which passes a sprocket chain 10 the said chain passing over a similar sprocket wheel 11 secured to the shaft 12 of the brush 13. The bearings 14 of the brush-shaft 12 are constructed so as to be adapted to move within the curved slots 15 of the guide plates 16 secured one on either side of the frame 1, the movement of said bearings being effected by the sweep of the slotted arms 17 one end of which loosely embraces the end of the shaft 7 and the other end having a slot 18 embracing the shaft 12. The arms 17 have additional slots 19 within which are adjustable the sliding weights 20 for varying the pressure of the brush against the ground. It will be apparent from an inspection of Fig. 1 that if the arms 17 are raised to the position indicated by the dotted lines in said figure, the bearings of the brush shaft will be elevated within the guide plates 16 carrying the shaft with them and consequently elevating the brush secured to said shaft.

To raise the arms 17 I devise the following mechanism: To the forward end of the frame 1, I mount the shaft 21 to the outer end of which is secured the hand wheel 22 and adjacent to the latter is secured the bevel gear wheel 23 meshing with the terminal bevel gear 24 of the longitudinal shaft 25 the opposite end of which carries a second bevel 26 meshing with the bevel 27 of the shaft 28 on which is mounted at either end a doubly grooved pulley 29 one of the grooves of said pulley receiving the end of a rope 30 secured in any convenient manner to the arm 17. Through the operation of the hand wheel and the intermediate gearing it is apparent that the end of the rope 30 may be made to wind on the groove of the pulley 29 and thus raise the arm 17 the latter describing the arc of a circle whose center is the shaft which the end of the arm 17 embraces.

As the brush is raised from the ground by the operation just described, it is desirable that the revolution of the brush be discontinued and I accordingly disengage the brush mechanism from the driving shaft 7 by the following mechanism: Secured to the shaft 28 is a cam 31 whose lateral surface co-operates with and oscillates one end of the lever arm 32 pivoted at a convenient point on the transverse standard or support 33. The opposite end of the lever arm 32 is bent downward the depending portion 34 being adapted to control between its forked ends 35 the grooved disk 36 revolving with the shaft 7 by reason of the feather 37 on said shaft operating within the disk 36. Between the disk 36 and the fixed bearing 38 is a spring 39 which drives the projecting pins 40 of the disk into suitable depressions made in the loose gear 6 thus causing the latter to rotate with the shaft 7 when the machine is working. Now, as the arms 17 elevate the brush by the operation heretofore described, the parts are so arranged and so related that at the same time the cam 31 oscillates the lever arm 32 so that its opposite end disengages the clutch mechanism from the gear wheel 6 and the brush in its elevated position will cease to revolve. The object of this construction is obvious when it is recollected that the dumping receptacle is dumped simultaneously with the raising of the brush, and of course it is desirable that the machine be driven along the ground with as little resistance and as little friction as possible while the dumping is taking place. For this reason the brush gearing is disengaged from the main driving shaft.

The dumping receptacle in the present instance is constructed as follows: Mounted between the depending supports 41 secured on either side of the frame 1 is a rotating dumping segmental trough having a curved bottom 42 and the terminal triangular sides 43. Rigidly secured between the supports 41 is a plate 44 and so disposed as to cover one of the longitudinally open ends of the dumping segment and thus form a bottom therefor, the edge of said plate 44 however allowing the bottom 42 of the segment to freely pass the same in the act of swinging. The segment swings on trunnions or mountings 45 in said supporting plates 41 and to each side 43 at a convenient point is secured a rope 46 which passes around the second groove of the pulley 29 previously described. It is obvious that the hand wheel with its intermediate mechanism can be made use of in elevating the segmental trough or swinging the same about its bearings. As the said trough swings to the position indicated in dotted lines in Fig. 1 it is apparent that the scraping plate 44 will drive before it and positively dump the entire contents from the trough into the street. It will therefore be seen that at the same time that the contents are dumped, the brush is raised, and the clutch disengages the brush driving mechanism from the driving shaft, enabling the machine to pass the pile it has dumped freely and without friction.

It is of course to be understood that I do not limit myself to the precise details of construction shown and described here. Any suitable clutch mechanism may be employed; the slot 18 of the arm 17 is of course for the purpose of allowing the arm to sweep about its pivotal point without binding, but this precise arrangement need not be adhered to.

Having described my invention, what I claim is—

1. A street sweeper and piler having a suitable receptacle, a brush for sweeping dirt into the same, means for positively forcing the contents from the receptacle, means for simultaneously elevating the brush upon dumping the receptacle, means for dumping said receptacle and suitable running gear for the brush, substantially as set forth.

2. A street sweeper and piler having a suitable receptacle, a brush for sweeping dirt into the same located adjacent thereto, means for positively forcing the contents from the receptacle, suitable running gear for the brush, and means for simultaneously dumping the receptacle, elevating the brush and disengaging the running gear of the brush, substantially as set forth.

3. A street sweeper and piler comprising a suitable open receptacle, a brush located adjacent to the open end of the same for sweeping dirt thereinto, suitable running gear for said brush, means for elevating said brush, and a scraping plate co-operating with the bottom of said receptacle for forcing out the contents from the same, substantially as set forth.

4. In a street sweeper and piler, a segmental open swinging trough, suitable supports for the same, and a scraping plate attached to the sweeper frame and co-operating with the bottom of the trough, substantially as set forth.

5. In a street sweeper and piler, a suitable rotating trough, a brush for sweeping dirt into the same, suitable ropes or chains for controlling said receptacle and brush, means for winding said ropes and simultaneously elevating said brush and rotating the receptacle, a shaft for said pulleys, suitable driving mechanism for said brush, a main driving shaft, and intermediate mechanism between the shaft carrying the pulleys and driving mechanism of the brush for disengaging the latter from the main driving shaft upon elevation of the brush, substantially as set forth.

6. In a street sweeper and piler, a suitable revolving brush, a shaft for the same, bearings for said shaft, suitable slotted guide plates for said bearings, a second shaft, sprocket wheels on said shaft, a second pair of sprocket wheels on the shaft of the brush, sprocket chains connecting the said sprocket wheels, arms loosely embracing the second shaft at one end, slots in said arms embracing the brush-shaft at the opposite end, and means for elevating the free ends of said arms thus elevating the brush at that end, substantially as set forth.

7. A street sweeper and piler comprising a suitable swinging receptacle, a brush located adjacent to the open end thereof for sweeping dirt into the same, suitable means for bodily forcing the contents from said receptacle while the latter is being dumped, means for dumping said receptacle, means for elevating said brush, and suitable running gear for said brush, substantially as set forth.

In testimony whereof I affix my signature in the presence of two witnesses.

TAYLOR W. DOWNS.

Witnesses:
  JAMES J. O'DONOHOE,
  EMIL STAREK.